(12) United States Patent
Chang et al.

(10) Patent No.: US 11,669,394 B2
(45) Date of Patent: Jun. 6, 2023

(54) CROSSING FRAMES ENCODING MANAGEMENT METHOD, MEMORY STORAGE APPARATUS AND MEMORY CONTROL CIRCUIT UNIT

(71) Applicant: PHISON ELECTRONICS CORP., Miaoli (TW)

(72) Inventors: Kuang-Yao Chang, Taipei (TW); Cheng-Jui Chang, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/376,194

(22) Filed: Jul. 15, 2021

(65) Prior Publication Data

US 2022/0413960 A1 Dec. 29, 2022

(30) Foreign Application Priority Data

Jun. 29, 2021 (TW) ................ 110123904

(51) Int. Cl.
*G06F 3/06* (2006.01)
*G06F 11/10* (2006.01)
*G06F 11/07* (2006.01)

(52) U.S. Cl.
CPC ........ *G06F 11/1068* (2013.01); *G06F 3/0619* (2013.01); *G06F 3/0652* (2013.01); *G06F 3/0659* (2013.01); *G06F 3/0679* (2013.01); *G06F 11/076* (2013.01); *G06F 11/0772* (2013.01)

(58) Field of Classification Search
CPC .. G06F 11/1068; G06F 3/0619; G06F 3/0652; G06F 3/0659; G06F 3/0679; G06F 11/076; G06F 11/0772; G06F 11/1044
USPC .......................................... 714/764
See application file for complete search history.

(56) References Cited

U.S. PATENT DOCUMENTS

| 7,395,489 | B2 * | 7/2008 | Itou | G06F 11/1064 |
| | | | | 714/764 |
| 8,245,101 | B2 * | 8/2012 | Olbrich | G06F 13/28 |
| | | | | 714/6.24 |
| 8,327,220 | B2 * | 12/2012 | Borchers | G06F 12/0246 |
| | | | | 714/764 |
| 2005/0180641 | A1 * | 8/2005 | Clark | G06T 9/00 |
| | | | | 375/240.1 |

(Continued)

*Primary Examiner* — Albert Decady
*Assistant Examiner* — Enam Ahmed
(74) *Attorney, Agent, or Firm* — JCIPRNET

(57) ABSTRACT

A crossing frames encoding management method, a memory storage apparatus, and a memory control circuit unit are disclosed. The method includes: reading a tag swap information corresponding to a first physical group; encoding a first data; storing a first part of the encoded first data to at least one first physical unit corresponding to a first tag information in the first physical group; and storing a second part of the encoded first data to at least one second physical unit corresponding to a second tag information in the first physical group according to the tag swap information. The first tag information corresponds to a first crossing frames encoding group. The second tag information corresponds to a second crossing frames encoding group. The first crossing frames encoding group is different from the second crossing frames encoding group.

29 Claims, 14 Drawing Sheets

(56) References Cited

U.S. PATENT DOCUMENTS

| | | | |
|---|---|---|---|
| 2009/0010152 A1* | 1/2009 | Ofek | H04L 47/56 |
| | | | 370/216 |
| 2011/0075478 A1* | 3/2011 | Yoon | G06F 11/1072 |
| | | | 365/185.24 |
| 2015/0154066 A1* | 6/2015 | Grimsrud | G06F 11/108 |
| | | | 714/764 |
| 2015/0154074 A1* | 6/2015 | Resch | G06F 11/1076 |
| | | | 714/764 |
| 2015/0293812 A1* | 10/2015 | Roberts | G11C 29/04 |
| | | | 714/764 |
| 2016/0055061 A1* | 2/2016 | Dhuse | G06F 12/1009 |
| | | | 714/764 |
| 2016/0188407 A1* | 6/2016 | Bronnikov | G06F 11/1076 |
| | | | 714/766 |
| 2018/0285267 A1* | 10/2018 | Sasanka | G06F 12/0811 |
| 2019/0196977 A1* | 6/2019 | Cong | G06F 3/065 |

* cited by examiner

|  |  |  |  |
|---|---|---|---|
| Tag_0 | Tag_1 | Tag_0 | Tag_1 |
| Tag_2 | Tag_3 | Tag_2 | Tag_3 |
| Tag_4 | Tag_5 | Tag_4 | Tag_5 |
| Tag_1 | Tag_0 | Tag_1 | Tag_0 |
| Tag_3 | Tag_2 | Tag_3 | Tag_2 |
| Tag_5 | Tag_4 | Tag_5 | Tag_4 |
| Tag_4 | Tag_5 | Tag_4 | Tag_5 |
| Tag_0 | Tag_1 | Tag_0 | Tag_1 |
| Tag_2 | Tag_3 | Tag_2 | Tag_3 |
| Tag_5 | Tag_4 | Tag_5(P) | Tag_4(P) |
| Tag_1 | Tag_0 | Tag_1(P) | Tag_0(P) |
| Tag_3 | Tag_2 | Tag_3(P) | Tag_2(P) |

CROSSING FRAMES ENCODING MANAGEMENT METHOD, MEMORY STORAGE APPARATUS AND MEMORY CONTROL CIRCUIT UNIT

CROSS-REFERENCE TO RELATED APPLICATION

This application claims the priority benefit of Taiwan application serial no. 110123904, filed on Jun. 29, 2021. The entirety of the above-mentioned patent application is hereby incorporated by reference herein and made a part of this specification.

BACKGROUND OF THE INVENTION

Field of the Invention

The invention relates to a group encoding management technique in a memory, and particularly relates to a crossing frames encoding management method, a memory storage apparatus, and a memory control circuit unit.

Description of Related Art

Portable electronic devices such as mobile phones and notebook computers have grown rapidly in the past few years, which has led to a rapid increase in consumer demand for storage media. Since a rewritable non-volatile memory module (such as a flash memory) has characteristics such as data non-volatility, power-saving, small size, and no mechanical structures, the rewritable non-volatile memory module is very suitable to be built into the various portable electronic devices provided above.

Under the redundant array of independent disks (RAID) error correction code (ECC) architecture, the data stored in a plurality of physical programming units (such as physical pages) in the rewritable non-volatile memory module may be encoded to generate parity data (also known as global parity data) that may protect data in a plurality of physical programming units at the same time. When decoding data, the global parity data may use the logical relationship between data bits in the plurality of physical programming units to perform cross-physical programming unit error detection and/or correction.

However, when a memory storage apparatus including a rewritable non-volatile memory module is shipped, a plurality of physical programming units that may be synchronously encoded in the rewritable non-volatile memory module are fixed and may be assigned the same tag (also referred to as an encoding tag). When storing data, the data in the physical programming units corresponding to the same tag may be synchronously encoded to generate a corresponding global parity data. However, as the loss of the rewritable non-volatile memory module is increased (for example, the P/E cycle is increased), once a plurality of physical programming units with a higher bit error rate (BER) appear at the same time in the plurality of physical programming units provided with the same tag, the data read from these physical programming units in the future may not be successfully decoded.

SUMMARY OF THE INVENTION

The invention provides a crossing frames encoding management method, a memory storage apparatus, and a memory control circuit unit that may dynamically manage a group encoding configuration of a data in the rewritable non-volatile memory module, thereby improving the use efficiency of the rewritable non-volatile memory module.

An exemplary embodiment of the invention provides a crossing frames encoding management method used in a rewritable non-volatile memory module. The rewritable non-volatile memory module includes a plurality of physical groups. Each of the plurality of physical groups includes a plurality of physical units. The crossing frames encoding management method includes: reading a tag swap information corresponding to a first physical group in the plurality of physical groups; encoding a first data; storing a first part of the encoded first data to at least one first physical unit corresponding to a first tag information in the first physical group; and storing a second part of the encoded first data to at least one second physical unit corresponding to a second tag information in the first physical group according to the tag swap information. The first tag information corresponds to a first crossing frames encoding group. The second tag information corresponds to a second crossing frames encoding group. The first crossing frames encoding group is different from the second crossing frames encoding group.

An exemplary embodiment of the invention further provides a memory storage apparatus including a connection interface unit, a rewritable non-volatile memory module, and a memory control circuit unit. The connection interface unit is configured to be coupled to the host system. The rewritable non-volatile memory module includes a plurality of physical groups. Each of the plurality of physical groups includes a plurality of physical units. The memory control circuit unit is coupled to the connection interface unit and the rewritable non-volatile memory module. The memory control circuit unit is configured to read a tag swap information corresponding to a first physical group in the plurality of physical groups. The memory control circuit unit is further configured to encode a first data. The memory control circuit unit is further configured to store a first part of the encoded first data to at least one first physical unit corresponding to a first tag information in the first physical group. The memory control circuit unit is further configured to store a second part of the encoded first data to at least one second physical unit corresponding to a second tag information in the first physical group according to the tag swap information. The first tag information corresponds to a first crossing frames encoding group. The second tag information corresponds to a second crossing frames encoding group. The first crossing frames encoding group is different from the second crossing frames encoding group.

An exemplary embodiment of the invention further provides a memory control circuit unit configured to control a rewritable non-volatile memory module. The rewritable non-volatile memory module includes a plurality of physical groups. Each of the plurality of physical groups includes a plurality of physical units. The memory control circuit unit includes a host interface, a memory interface, an error detection and correction circuit, and a memory management circuit. The host interface is configured to be coupled to a host system. The memory interface is configured to be coupled to the rewritable non-volatile memory module. The memory management circuit is coupled to the host interface, the memory interface, and the error detection and correction circuit. The memory management circuit is configured to read a tag swap information corresponding to a first physical group in the plurality of physical groups. The error detection and correction circuit is configured to encode a first data. The memory management circuit is further configured to store a first part of the encoded first data to at least one first physical unit corresponding to a first tag information in the first physical group. The memory management circuit is further configured to store a second part of the encoded first data to at least one second physical unit corresponding to a second tag information in the first physical group according to the tag swap information. The first tag information corresponds to a first crossing frames encoding group. The second tag information corresponds to a second crossing frames encoding group. The first crossing frames encoding group is different from the second crossing frames encoding group.

An exemplary embodiment of the invention further provides a memory storage apparatus including a connection interface unit, a rewritable non-volatile memory module, and a memory control circuit unit. The connection interface unit is configured to be coupled to a host system. The rewritable non-volatile memory module includes a plurality of physical groups. Each of the plurality of physical groups includes a plurality of physical units. The memory control circuit unit is coupled to the connection interface unit and the rewritable non-volatile memory module. The memory control circuit unit is configured to send a read command sequence instructing to read a second data from a first physical group in the plurality of physical groups. The memory control circuit unit is further configured to adjust a configuration of a crossing frames encoding group of the first physical group according to a bit error status of the second data. The configuration of the crossing frames encoding group reflects that a plurality of physical units in the first physical group belong to a same crossing frames encoding group. The memory control circuit unit is further configured to access the first physical group according to the adjusted configuration of the crossing frames encoding group.

Based on the above, after the tag swap information corresponding to the first physical group is read, the first part of the encoded first data may be stored in the first physical unit corresponding to the first tag information in the first physical group. Moreover, the second part of the encoded first data may be stored in the second physical unit corresponding to the second tag information in the first physical group according to the tag swap information. The first tag information corresponds to the first crossing frames encoding group. The second tag information corresponds to the second crossing frames encoding group. The first crossing frames encoding group is different from the second crossing frames encoding group. By dynamically managing the group encoding configuration of the data in the rewritable non-volatile memory module, the use efficiency of the rewritable non-volatile memory module may be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 is a schematic diagram illustrating a preset tag configuration of a physical group according to an exemplary embodiment of the invention.

DESCRIPTION OF THE EMBODIMENTS

A memory storage apparatus (also referred to as a memory storage system) typically includes a rewritable non-volatile memory module and a controller (also referred to as a control circuit unit). The memory storage apparatus is usually used together with a host system, such that the host system is able to write data into or read data from the memory storage apparatus.

Figure 1:
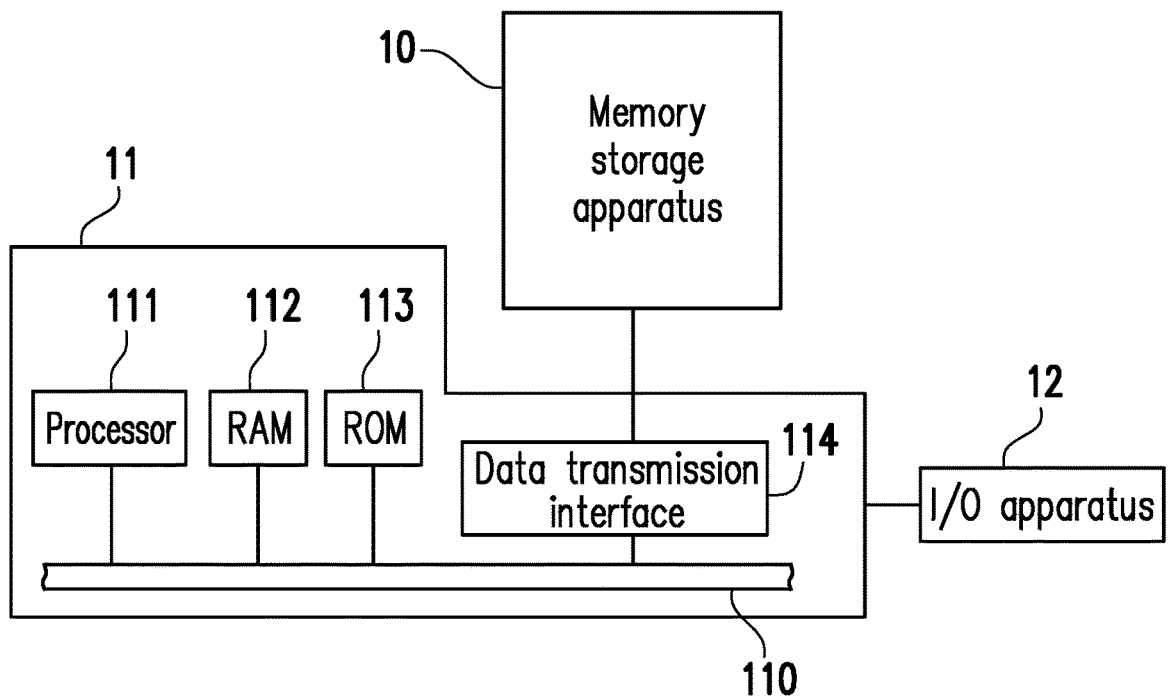
FIG. 1 is a schematic diagram illustrating a host system, a memory storage apparatus, and an input/output (I/O) apparatus according to an exemplary embodiment of the invention.
Figure 2:
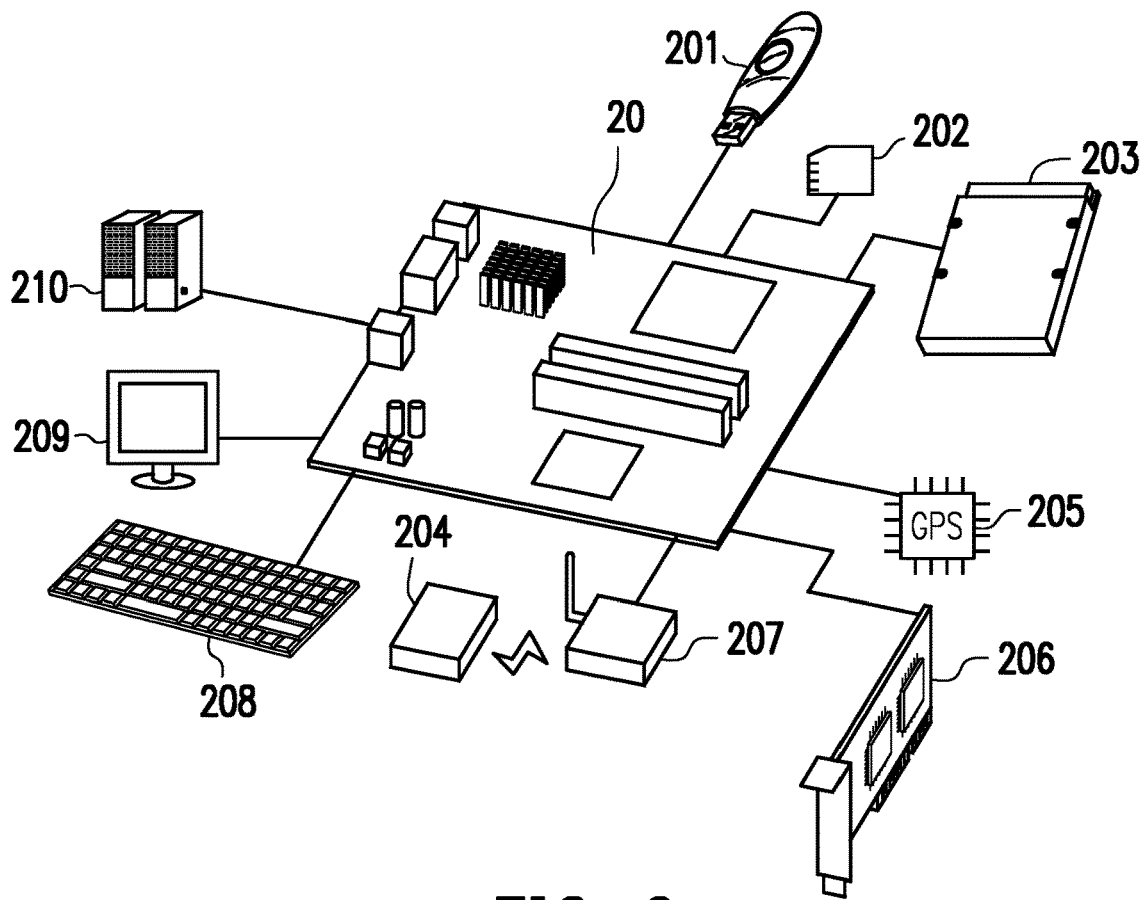
FIG. 2 is a schematic diagram illustrating a host system, a memory storage apparatus, and an I/O apparatus according to another exemplary embodiment of the invention.

FIG. 1 is a schematic diagram illustrating a host system, a memory storage apparatus, and an input/output (I/O) apparatus according to an exemplary embodiment. FIG. 2 is a schematic diagram illustrating a host system, a memory storage apparatus, and an I/O apparatus according to another exemplary embodiment.

With reference to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are coupled to a system bus 110.

In an exemplary embodiment, the host system 11 is coupled to the memory storage apparatus 10 through the data transmission interface 114. For instance, the host system 11 writes data into the memory storage apparatus 10 or reads data from the memory storage apparatus 10 through the data transmission interface 114. The host system 11 is coupled to the I/O apparatus 12 through the system bus 110. For instance, the host system 11 transmits an output signal to the I/O apparatus 12 or receives an output signal from the I/O apparatus 12 through the system bus 110.

In the present exemplary embodiment, the processor 111, the RAM 112, the ROM 113, and the data transmission interface 114 are configured on a motherboard 20 of the host system 11. The number of the data transmission interface 114 may be one or a plurality. The motherboard 20 is coupled to the memory storage apparatus 10 in a wireless manner or via a cable through the data transmission interface 114.

In an exemplary embodiment, the memory storage apparatus 10 is, for instance, a flash drive 201, a memory card 202, a solid-state drive (SSD) 203, or a wireless memory storage apparatus 204. The wireless memory storage apparatus 204 may be a memory storage apparatus employing various wireless communication techniques, such as a near-field communication (NFC) memory storage apparatus, a wireless fidelity (Wi-Fi) memory storage apparatus, a Bluetooth memory storage apparatus, a Bluetooth memory storage apparatus with low power consumption (e.g., an iBeacon), and so on. The motherboard 20 may also be coupled to a variety of I/O apparatuses, such as a global positioning system (GPS) module 205, a network interface card 206, a wireless transmission apparatus 207, a keyboard 208, a screen 209, and a speaker 210 through the system bus 110. For instance, in an exemplary embodiment, the motherboard 20 may access the wireless memory storage apparatus 204 through the wireless transmission apparatus 207.

In an exemplary embodiment, the host system 11 is a computer system. In an exemplary embodiment, the host system 11 may be any system that may substantially store data with a memory storage apparatus.

Figure 3:
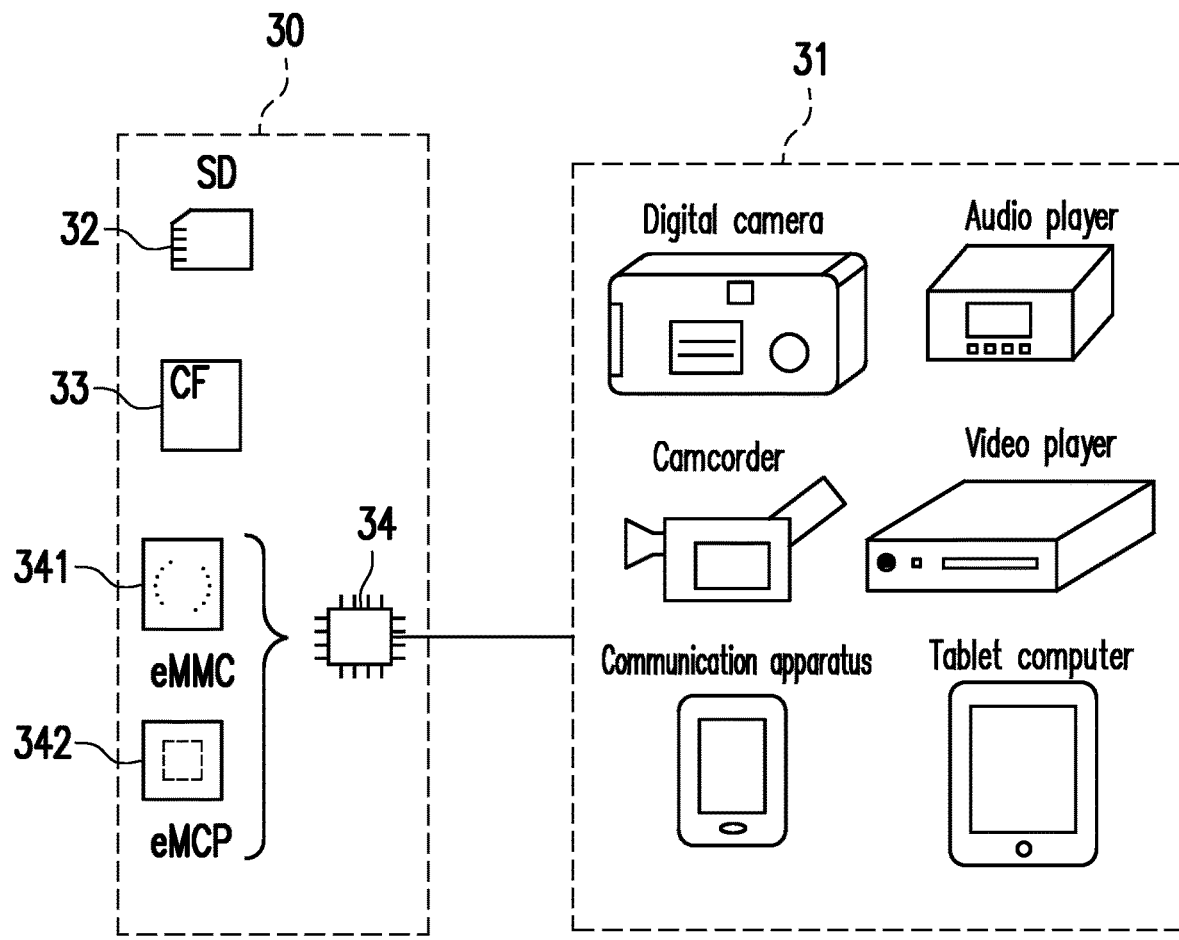
FIG. 3 is a schematic diagram illustrating a host system and a memory storage apparatus according to another exemplary embodiment the invention.

FIG. 3 is a schematic diagram illustrating a host system and a memory storage apparatus according to another exemplary embodiment the invention. With reference to FIG. 3, in another exemplary embodiment, a host system 31 may also be a digital camera, a camcorder, a communication apparatus, an audio player, a video player, a tablet computer, and so on, while a memory storage apparatus 30 used by the host system 31 may be a non-volatile memory apparatus, such as a secure digital (SD) card 32, a compact flash (CF) card 33, and an embedded storage apparatus 34. The embedded storage apparatus 34 includes an embedded multimedia card (eMMC) 341 and/or an embedded multi-chip package (eMCP) storage apparatus 342, wherein a memory module is directly coupled to a substrate of the host system.

Figure 4:
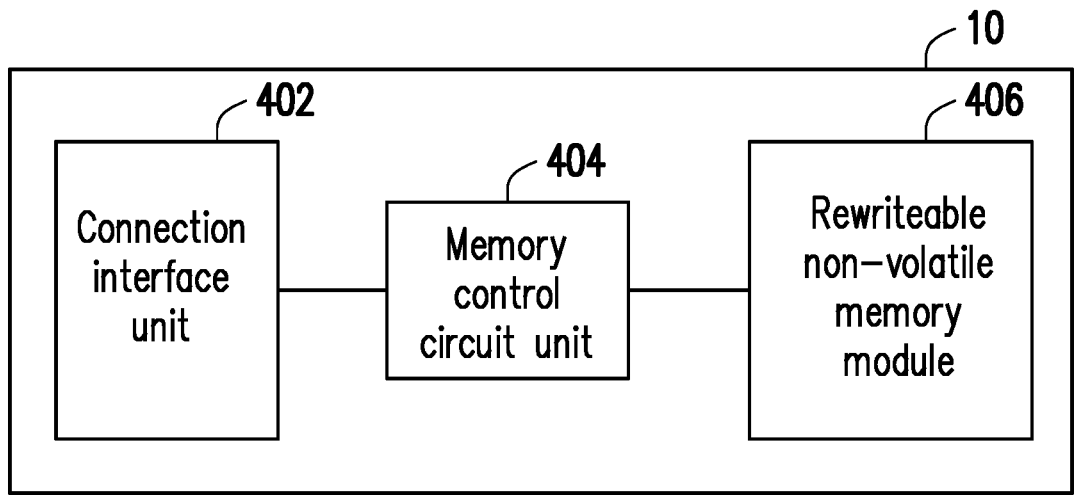
FIG. 4 is a schematic block diagram illustrating a memory storage apparatus according to an exemplary embodiment of the invention.

FIG. 4 is a schematic block diagram illustrating a memory storage apparatus according to an exemplary embodiment of the invention. Referring to FIG. 4, the memory storage apparatus 10 includes a connection interface unit 402, a memory control circuit unit 404, and a rewritable non-volatile memory module 406.

The connection interface unit 402 is configured to couple the memory storage apparatus 10 to the host system 11. The memory storage apparatus 10 may communicate with the host system 11 via the connection interface unit 402. In an exemplary embodiment, the connection interface unit 402 is compatible with the Peripheral Component Interconnect Express (PCI Express) standard. In an exemplary embodiment, the connection interface unit 402 may also be compatible with the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be sealed in one chip with the memory control circuit unit 404. Alternatively, the connection interface unit 402 is disposed outside of a chip containing the memory control circuit unit 404.

The memory control circuit unit 404 is coupled to the connection interface unit 402 and the rewritable non-volatile memory module 406. The memory control circuit unit 404 is configured to execute a plurality of logic gates or control commands implemented in a hardware form or in a firmware form. The memory control circuit unit 404 also performs operations such as writing, reading, and erasing data in the rewritable non-volatile memory storage module 406 according to the commands of the host system 11.

The rewritable non-volatile memory module 406 is configured to store the data written by the host system 11. The rewritable non-volatile memory module 406 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 406 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 406 has a plurality of storage statuses. Which storage status one memory cell belongs to may be determined via the application of a read voltage, so as to obtain one or a plurality of bits stored by the memory cell.

In an exemplary embodiment, the memory cells of the rewritable non-volatile memory module 406 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND-type flash memory, the write speed of the lower physical programming unit is greater than the write speed of the upper physical programming unit, and/or the reliability of the lower physical programming unit is greater than the reliability of the upper physical programming unit.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundant bit area. The data bit area contains a plurality of physical pages configured to store user data, and the redundant bit area is configured to store system data (for example, management data such as an ECC). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
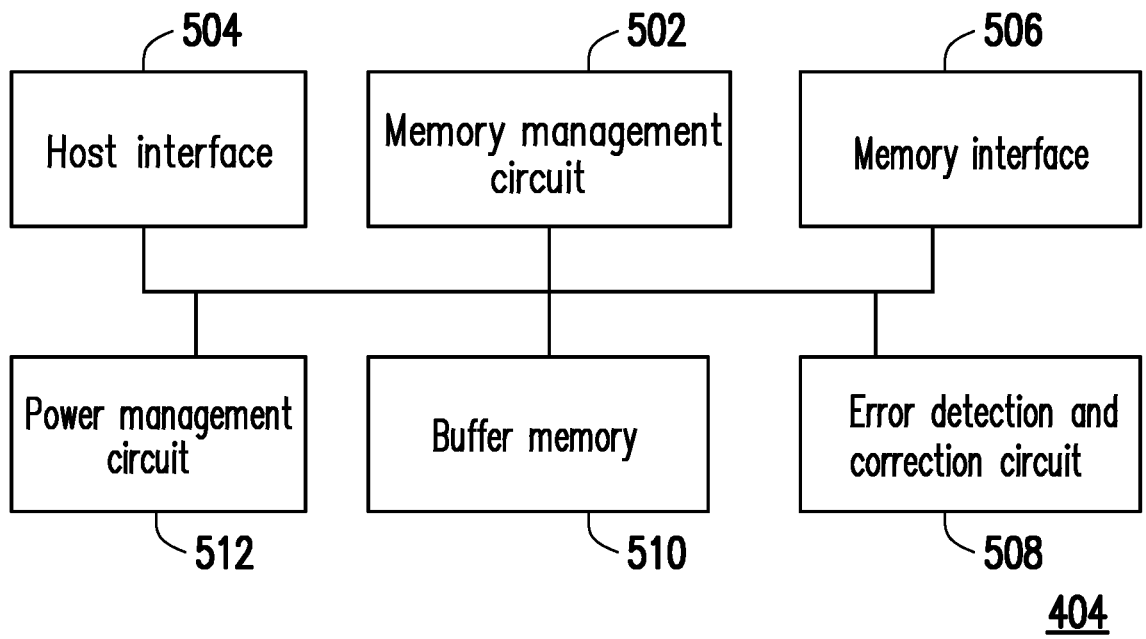
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention. Referring to FIG. 5, the memory control circuit unit 404 includes a memory management circuit 502, a host interface 504, a memory interface 506, and an error detection and correction circuit 508.

The memory management circuit 502 is configured to control the overall operation of the memory control circuit unit 404. Specifically, the memory management circuit 502 has a plurality of control commands. During operation of the memory storage apparatus 10, the control commands are executed to perform operations such as writing, reading, and erasing data. In the following, descriptions relating to the operation of the memory management circuit 502 are equivalent to the descriptions of the operation of the memory control circuit unit 404.

In an exemplary embodiment, the control commands of the memory management circuit 502 are implemented in a firmware form. For example, the memory management circuit 502 has a microprocessor unit (not shown) and a read-only memory (not shown), and the control commands are burned into the ROM. During the operation of the memory storage apparatus 10, the control commands are executed by the microprocessor unit to perform operations such as writing, reading, and erasing data.

In an exemplary embodiment, the control commands of the memory management circuit 502 may also be stored in the form of program codes in a specific area (for example, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the boot code to load the control commands stored in the rewritable non-volatile memory module 406 into the RAM of the memory management circuit 502. Next, the microprocessor unit runs the control commands to perform operations such as writing, reading, and erasing data.

In an exemplary embodiment, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, the read command sequence, and the erase command sequence may independently include one or a plurality of program codes or command codes and be configured to instruct the rewritable non-volatile memory module 406 to execute corresponding operations such as writing, reading, and erasing. In an exemplary embodiment, the memory management circuit 502 may also issue other types of command sequences to the rewritable non-volatile memory module 406 to instruct the execution of corresponding operations.

The host interface 504 is coupled to the memory management circuit 502. The memory management circuit 502 may communicate with the host system 11 via the host interface 504. The host interface 504 may be configured to receive and identify commands and data sent by the host system 11. For example, the commands and data sent by the host system 11 may be sent to the memory management circuit 502 via the host interface 504. In addition, the memory management circuit 502 may send data to the host system 11 via the host interface 504. In the present exemplary embodiment, the host interface 504 is compatible with the PCI Express standard. However, it should be understood that the invention is not limited thereto, and the host interface 504 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 506 is coupled to the memory management circuit 502 and is configured to access the rewritable non-volatile memory module 406. In other words, data to be written into the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 sends a corresponding command sequence. For example, the command sequence may include a write command sequence instructing data writing, a read command sequence instructing data reading, an erase command sequence instructing data erasing, and a corresponding command sequence configured to instruct various memory operations (such as changing a read voltage level or executing a garbage collection operation). The command sequences are generated by, for example, the memory management circuit 502 and sent to the rewritable non-volatile memory module 406 via the memory interface 506. The command sequences may include one or a plurality of signals or data on a bus. The signals or data may include a command code or a program code. For example, when reading a command sequence, information such as read identification code or memory address is included.

The error detection and correction circuit 508 is coupled to the memory management circuit 502 and is configured to execute an error detection and correction operation to ensure the correctness of data. Specifically, when the memory management circuit 502 receives a write command from the host system 11, the error detection and correction circuit 508 generates a corresponding error correction code (ECC) and/or an error detection code (EDC) for data corresponding to the write command, and the memory management circuit 502 writes the data corresponding to the write command and the corresponding ECC and/or EDC into the rewritable non-volatile memory module 406. Next, when reading data from the rewritable non-volatile memory module 406, the memory management circuit 502 reads the ECC and/or the EDC corresponding to the data at the same time, and the error detection and correction circuit 508 executes an error detection and correction operation on the read data based on the ECC and/or the EDC.

In an exemplary embodiment, the memory control circuit unit 404 further includes a buffer memory 510 and a power management circuit 512. The buffer 510 is coupled to the memory management circuit 502 and is configured to temporarily store data and commands from the host 11 or data from the rewritable non-volatile memory module 406. The power management circuit 512 is coupled to the memory management circuit 502 and is configured to control the power of the memory storage apparatus 10.

In an exemplary embodiment, in FIG. 4, the memory storage apparatus 10 is also referred to as a flash memory storage apparatus, the rewritable non-volatile memory module 406 is also referred to as a flash memory module, and the memory control circuit unit 404 is also referred to as a flash memory controller. In an exemplary embodiment, the memory management circuit 502 of FIG. 5 is also referred to as a flash memory management circuit.

Figure 6:
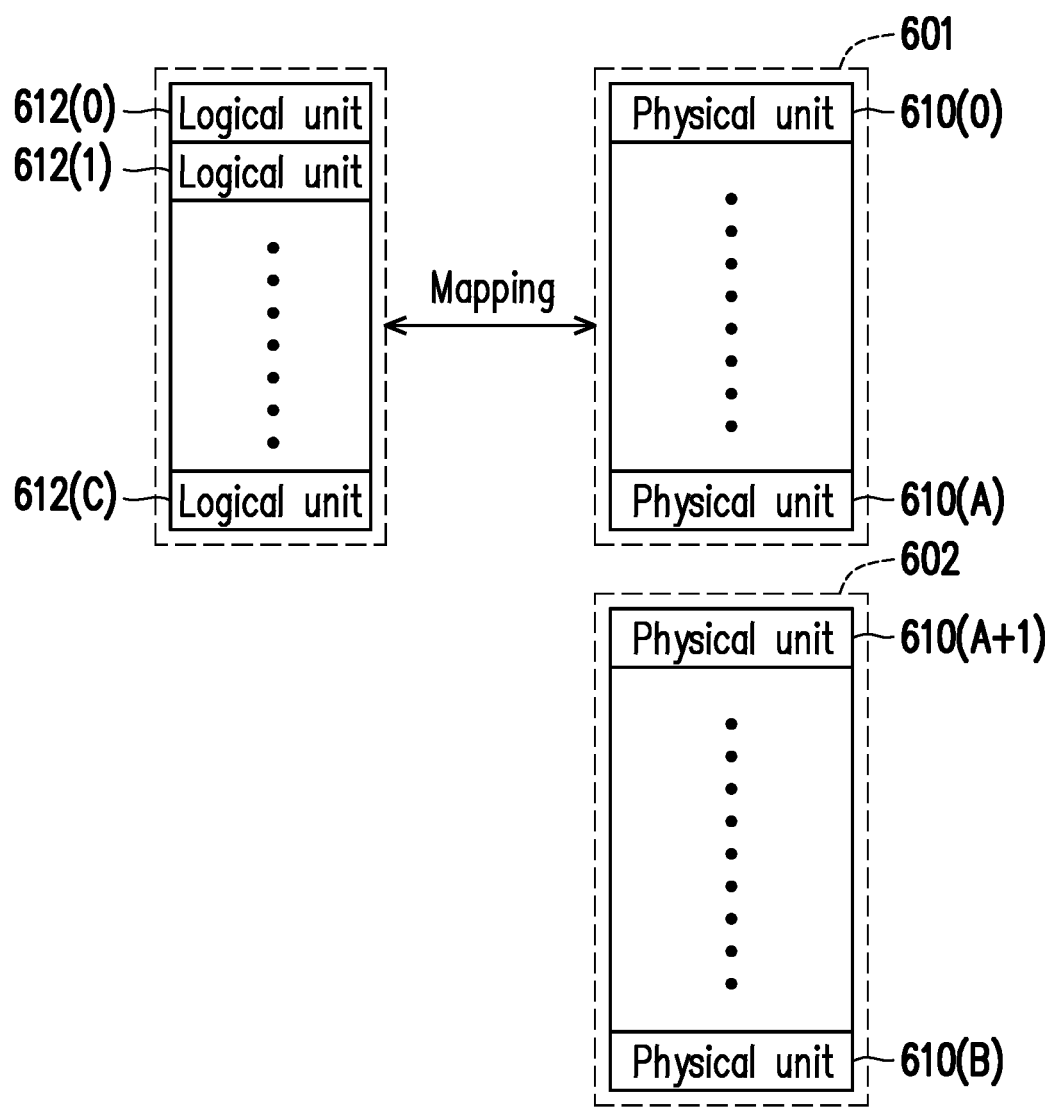
FIG. 6 is a schematic diagram illustrating the management of a rewritable non-volatile memory module according to an exemplary embodiment of the invention.

FIG. 6 is a schematic diagram illustrating the management of a rewritable non-volatile memory module according to an exemplary embodiment of the invention. Referring to FIG. 6, the memory management circuit 502 may logically group physical units 610(0) to 610(C) in the rewritable non-volatile memory module 406 into a storage area 601 and a spare area 602. In the present exemplary embodiment, one physical unit refers to one physical address or one physical programming unit. In another exemplary embodiment, one physical unit may also be formed by a plurality of continuous or discontinuous physical addresses.

The physical units 610(0) to 610(A) in the storage area 601 are configured to store user data (for example, user data from the host system 11 in FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, then this physical unit may be associated (or added) to the spare area 602. In addition, the physical units in the spare area 602 (or physical units that do not store valid data) may be erased. When writing new data, one physical unit may be extracted from the spare area 602 to store the new data. In an exemplary embodiment, the spare area 602 is also referred to as a free pool.

The memory management circuit 502 may configure logic units 612(0) to 612(C) to map the physical units 610(0) to 610(A) in the storage area 601. In an exemplary embodiment, each of the logic units corresponds to one logical address. For example, one logical address may include one or a plurality of logical block addresses (LBAs) or other logical management units. In another exemplary embodiment, one logic unit may also correspond to one logic programming unit or formed by a plurality of continuous or discontinuous logical addresses. Moreover, one logic unit may be mapped to one or a plurality of physical units. It should be noted that if a certain physical unit is currently mapped by a certain logic unit, then the data currently stored in this physical unit is valid data. On the other hand, if a certain physical unit is not currently mapped by any logic unit, then the data currently stored in this physical unit is invalid data.

The memory management circuit 502 may record the management data describing the mapping relationship between logic units and physical units (also referred to as logical-to-physical or logical address-to-logical address (L2P) mapping information) in at least one L2P mapping table. When the host system 11 is to read data from the memory storage apparatus 10 or write data to the memory storage apparatus 10, the memory management circuit 502 may execute a data access operation on the memory storage apparatus 10 according to the L2P mapping table.

Figure 7:
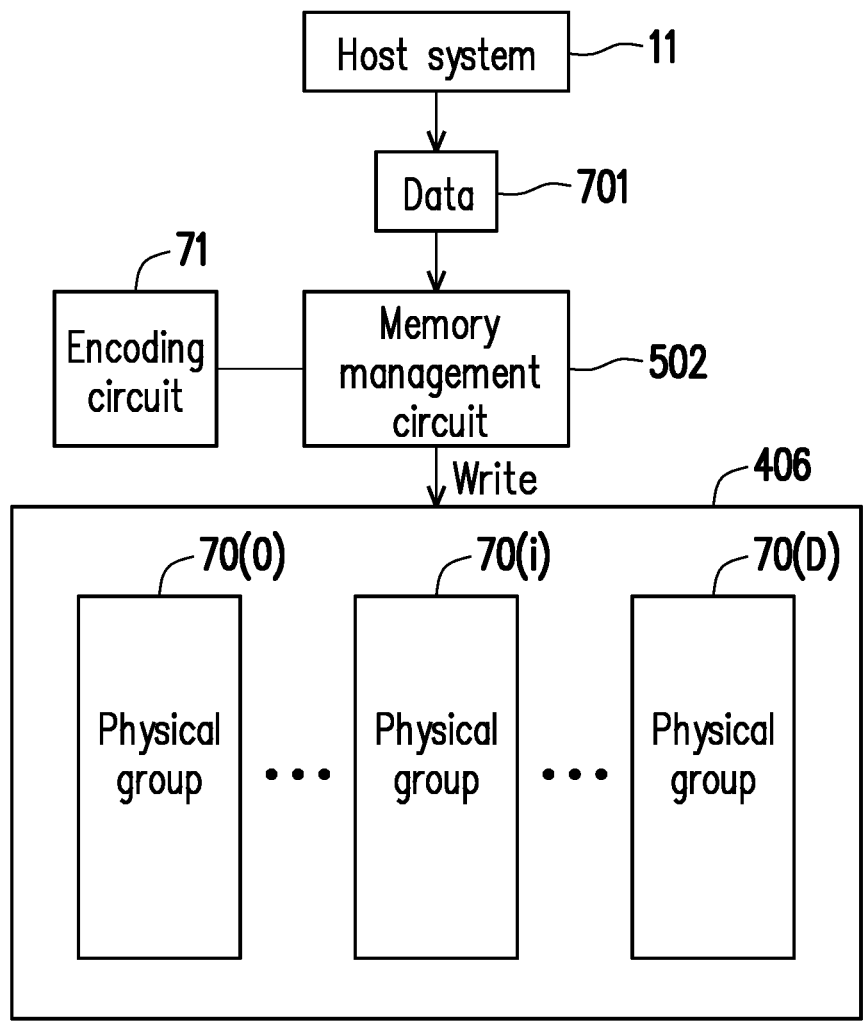
FIG. 7 is a schematic diagram illustrating writing a new data according to an exemplary embodiment of the invention.

FIG. 7 is a schematic diagram illustrating writing a new data according to an exemplary embodiment of the invention. Referring to FIG. 7, after receiving a write command instructing to store a data 701 from the host system 11, the memory management circuit 502 may instruct the encoding circuit 71 to encode the data 701. Then, the memory management circuit 502 may instruct the rewritable non-volatile memory module to store the data 701 encoded by the encoding circuit 71 to one of physical groups 70(0) to 70(D) in the rewritable non-volatile memory module 406. Each of the physical groups 70(0) to 70(D) may include a plurality of physical units in FIG. 6. In an exemplary embodiment, one or a plurality of physical groups may also form one virtual block.

The encoding circuit 71 may be included in the error detection and correction circuit 508 and may be configured to perform encoding (and decoding) on the data 701. It should be noted that the encoding circuit 71 may perform RAID ECC encoding or similar multi-frame (also known as crossing frame) encoding (and decoding) operations on the data 701. For example, in RAID ECC encoding or similar multi-frame encoding operations, the data 701 may be encoded across physical units (such as cross-physical programming units) to generate parity data (i.e., global parity data) that may be configured to protect a plurality of physical units (such as a plurality of physical programming units) at the same time. For example, the encoding circuit 71 may adopt Reed-Solomon code (RS code) or exclusive OR (XOR) encoding/decoding algorithms to encode (and decode) data. The data 701 encoded by the encoding circuit 71 and the global parity data generated by encoding the data 701 may be stored in a plurality of physical units with the same tag (also referred to as an encoded tag). Then, when data is read, if there is error in the read data 701, the encoding circuit 71 may read the encoded data 701 and the corresponding global parity data from a plurality of physical units with the same tag and use these data to decode the read data 701, so as to attempt to correct the error in the read data 701.

FIG. 8 is a schematic diagram illustrating a tag configuration of a physical group according to an exemplary embodiment of the invention. Referring to FIG. 8, taking the physical group 70(*i*) in the physical group 70(0) to 70(D) as an example, the memory management circuit 502 may pre-configure one tag (also referred to as an initial tag) for each physical unit in the physical group 70(*i*), for example, one of tags Tag_0 to Tag_5. For example, the tag corresponding to each physical unit may be pre-stored in each physical unit or in the system management table before the memory storage apparatus 10 or the rewritable non-volatile memory module 406 is shipped. The tag may reflect the crossing frames encoding group to which each physical unit belongs. After RAID ECC encoding or similar multi-frame encoding operations are performed on the data, the encoded data and the corresponding global parity data may be stored in a plurality of physical units with the same tag. Then, the data stored in the plurality of physical units with the same tag may be used together to decode an error in the data in one or a plurality of physical units.

In an exemplary embodiment, one specific tag corresponds to one specific crossing frames encoding group. Different tags correspond to different crossing frames encoding groups. Taking FIG. 7 as an example, the encoded data 701 and the global parity data generated by encoding the data 701 may be preset to be stored in physical units 810(0) to 810(7) corresponding to the same tag Tag_0 in the physical group 70(*i*). For example, the encoded data 701 may be stored in the physical units 810(0) to 810(6) in sections, and the global parity data generated by encoding the data 701 may be stored in the physical unit 810(7). When the data 701 needs to be read from the physical group 70(*i*) later, all or at least part of the data stored in the physical units 810(0) to 810(7) may be configured to decode the data read from any one of the physical units 810(0) to 810(7) to attempt to correct an error in the read data. By analogy, a certain coded data and corresponding parity data (i.e., global parity data) may be stored in a plurality of physical units corresponding to a tag Tag_k, and k may be any integer from 0 to 5.

In an exemplary embodiment, if there are too many errors in the data in a plurality of physical units corresponding to the tag Tag_k in the physical group 70(*i*), then the encoding circuit 71 may not be able to smoothly correct all errors in the data read from a certain physical unit corresponding to the same Tag_k.

In an exemplary embodiment, if there are too many errors in the data in the plurality of physical units corresponding to the tag Tag_k in the physical group 70(*i*), then the memory management circuit 502 may update, adjust, or change the configuration of the crossing frames encoding group of the physical group 70(*i*) (such as swapping a certain physical unit corresponding to the tag Tag_k with a certain physical unit corresponding to a tag Tag_p, and k is not equal to p), so as to improve the reliability of the data stored in the physical group 70(*i*) in the future.

Figure 9:
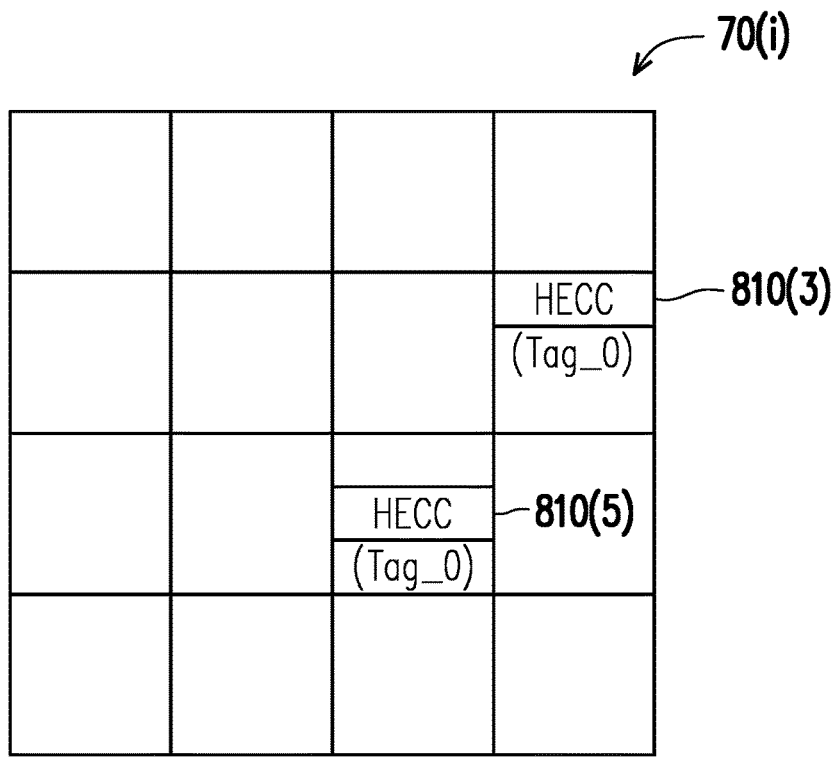
FIG. 9 is a schematic diagram illustrating a physical unit with a high bit error rate according to an exemplary embodiment of the invention.

FIG. 9 is a schematic diagram illustrating a physical unit with a high bit error rate according to an exemplary embodiment of the invention. Referring to FIG. 9, taking the tag Tag_0 as an example, in the case that there are too many error bits in the data read from the physical units 810(3) and 810(5) corresponding to the tag Tag_0 (marked as HECC in FIG. 9), the error in the data subsequently read from the physical unit(s) 810(3) and/or 810(5) may not be completely corrected. In this case, if the grouping configuration of the physical unit corresponding to the tag Tag_0 is not dynamically adjusted, any subsequent data read from the physical unit corresponding to the tag Tag_0 may not be successfully decoded, and the entire physical group 70(*i*) may even be unusable.

Figure 10:
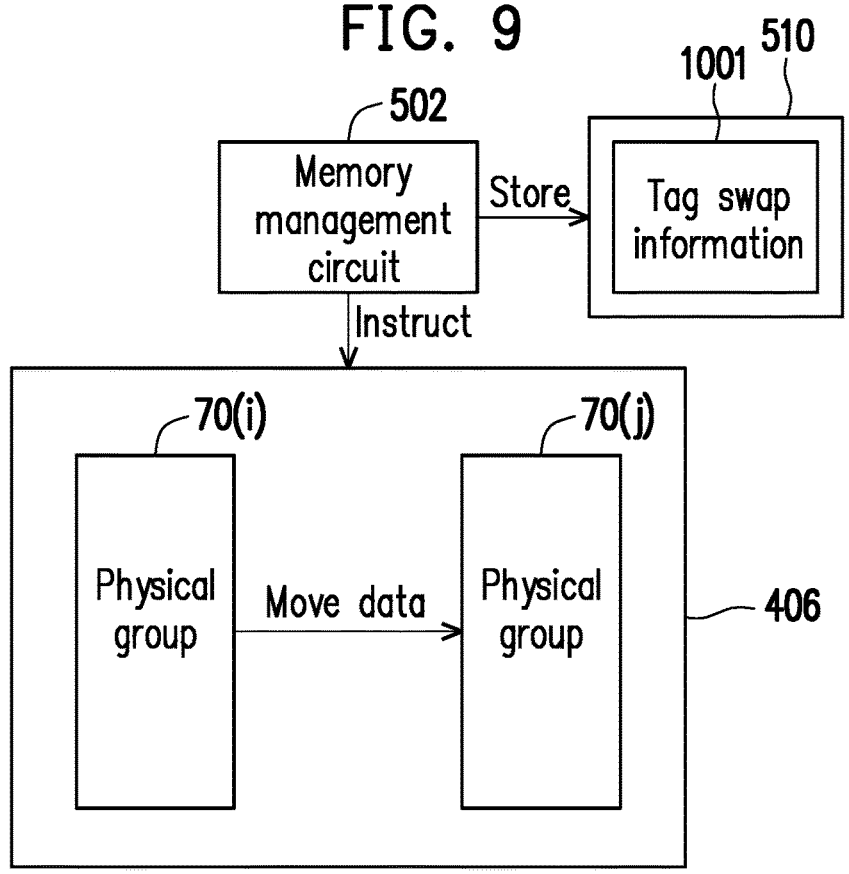
FIG. 10 is a schematic diagram illustrating storing a tag swap information and moving a data according to an exemplary embodiment of the invention.

FIG. 10 is a schematic diagram illustrating storing a tag swap information and moving a data according to an exemplary embodiment of the invention. Referring to FIG. 10, in an exemplary embodiment, the memory management circuit 502 may select the physical group 70(*i*) from the physical groups 70(0) to 70(D) of FIG. 7. In the state that the physical group 70(*i*) stored data, the memory management circuit 502 may send a read command sequence to the rewritable non-volatile memory module 406 to instruct the rewritable non-volatile memory module 406 to read data (also referred to as the second data) from the physical group 70(*i*). The memory management circuit 502 may store a tag swap information 1001 according to the bit error status of the second data. For example, the memory management circuit 502 may instruct the error detection and correction circuit 508 (or the encoding circuit 71) to decode the second data and obtain the bit error status of the second data according to the decoding result. For example, in the case that the decoding result of the second data may reflect the bit error rate of the second data, the memory management circuit 502 may obtain the bit error status of the second data according to the bit error rate of the second data. Then, the memory management circuit 502 may generate the tag swap information 1001 according to the bit error status of the second data. The memory management circuit 502 may store the tag swap information 1001 in the buffer memory 510.

In an exemplary embodiment, the tag swap information 1001 is configured to perform tag swap on at least two physical units in the physical group 70(*i*). Via this tag swap, a certain tag originally pointed to a physical unit with a higher bit error rate (for example, the bit error rate is higher than a preset value) may be changed to point to another physical unit with a lower bit error rate (for example, the bit error rate is not higher than the preset value). In an exemplary embodiment, compared to always using a fixed tag configuration, dynamically adjusting the tag configuration (i.e., the grouping configuration of crossing frames encoding) of at least part of the physical units in the physical group 70(*i*) may effectively improve the subsequent decoding efficiency of the data in the physical group 70(*i*) and/or prolong the service life of the physical group 70(*i*).

In an exemplary embodiment, the memory management circuit 502 may move the second data originally stored in the physical group 70(*i*) to another physical group 70(*j*) according to the bit error status of the second data. The value of i is not equal to the value of j. For example, in the process of moving the second data, the second data may be read from the physical group 70(*i*) and decoded by the error detection and correction circuit 508 (or the encoding circuit 71). Then, the decoded second data may be stored in the physical group 70(*j*). After the second data is moved, the second data still stored in the physical group 70(*i*) may be marked as invalid, and the physical group 70(*i*) may be erased.

In an exemplary embodiment, the memory management circuit 502 may determine whether the bit error condition of the second data meets a specific condition. If the bit error status of the second data meets a specific condition, then the memory management circuit 502 may generate the tag swap information 1001. However, if the bit error status of the second data does not meet the specific condition, then the memory management circuit 502 may not generate the tag swap information 1001 and may not move the second data to the physical group 70(j).

In an exemplary embodiment, the memory management circuit 502 may determine whether the bit error rate of the data read from a certain physical unit in the physical group 70(i) is higher than a preset value. If the bit error rate of the data read from the certain physical unit in the physical group 70(i) is higher than the preset value, then the memory management circuit 502 may mark the physical unit. For example, the physical unit is marked as a physical unit with a high bit error rate (marked as HECC in FIG. 9).

In an exemplary embodiment, the memory management circuit 502 may determine whether the total number of physical units with a high bit error rate in a plurality of physical units corresponding to the same tag Tag_k in the physical group 70(i) is higher than or equal to a preset number. If the total number of physical units with a high bit error rate in the plurality of physical units corresponding to the same tag Tag_k in the physical group 70(i) is equal to or higher than the preset number, then the memory management circuit 502 may generate the tag swap information 1001 corresponding to the tag Tag_k. On the other hand, if the total number of physical units with a high bit error rate in the physical units corresponding to the same tag Tag_k in the physical group 70(i) is lower than the preset number, then the memory management circuit 502 may not generate the tag swap information 1001.

Taking FIG. 8 and FIG. 9 as an example, the preset number is assumed to be 2. When the physical units 810(3) and 810(5) are both detected as physical units with a high bit error rate, the memory management circuit 502 may determine that in the plurality of physical units corresponding to the tag Tag_0 in the physical group 70(i), the total number (for example, 2) of the physical units with a high bit error rate is equal to the preset number (for example, 2). Therefore, the memory management circuit 502 may generate the tag swap information 1001 corresponding to the tag Tag_0. The tag swap information 1001 corresponding to the tag Tag_0 may record information configured to swap the tag (i.e., Tag_0) corresponding to the physical units 810(3) and 810(5) with a higher bit error rate with the tags corresponding to other physical units with a lower bit error rate.

Figure 11:
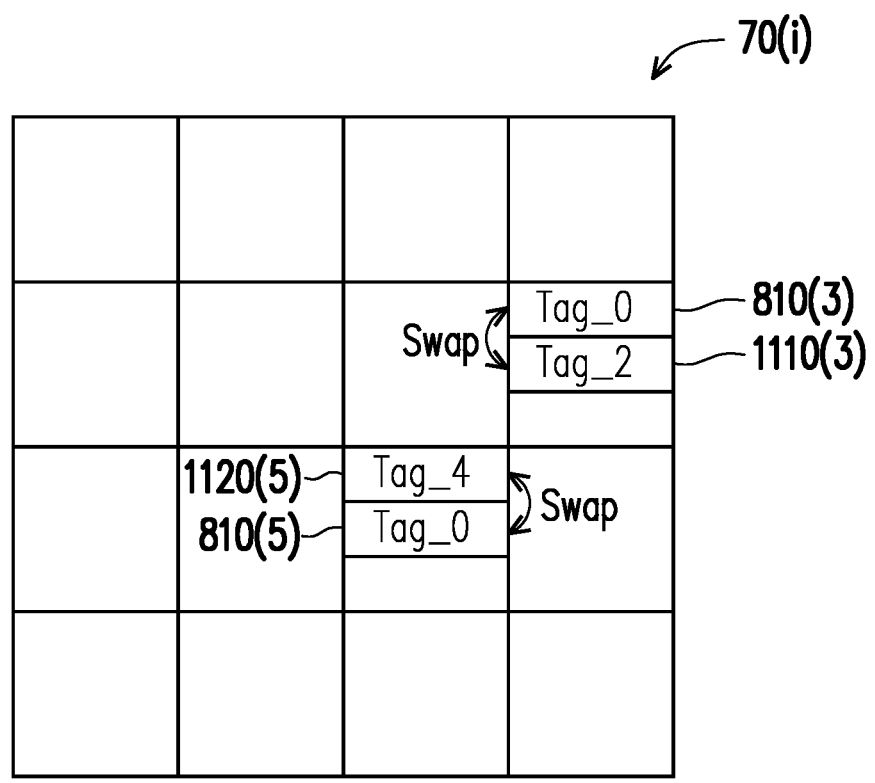
FIG. 11 is a schematic diagram illustrating a tag swap according to an exemplary embodiment of the invention.

FIG. 11 is a schematic diagram illustrating tag swap according to an exemplary embodiment of the invention. Referring to FIG. 11, according to the tag swap information 1001, when data is stored in the physical group 70(i), the tag Tag_0 corresponding to the physical unit 810(3) and the tag Tag_2 corresponding to a physical unit 1110(3) may be swapped, and the tag Tag_0 corresponding to the physical unit 810(5) and the tag Tag_4 corresponding to a physical unit 1120(5) may be swapped. Accordingly, when data is stored in the physical group 70(i), the physical units 810(3) and 810(5) originally corresponding to the tag Tag_0 and with a higher bit error rate may be adjusted to correspond to the tags Tag_2 and Tag_4, respectively to avoid too many physical units with a high bit error rate to store data corresponding to the same tag Tag_0 at the same time.

In other words, in an exemplary embodiment, the application of the tag swap information 1001 may include distributing a plurality of physical units originally corresponding to the same tag Tag_k and with a higher bit error rate to store data corresponding to another tag Tag_p, and the value of p is different from the value of k. In this way, the total number of error bits in the data corresponding to the same tag Tag_k may be reduced.

Figure 12:
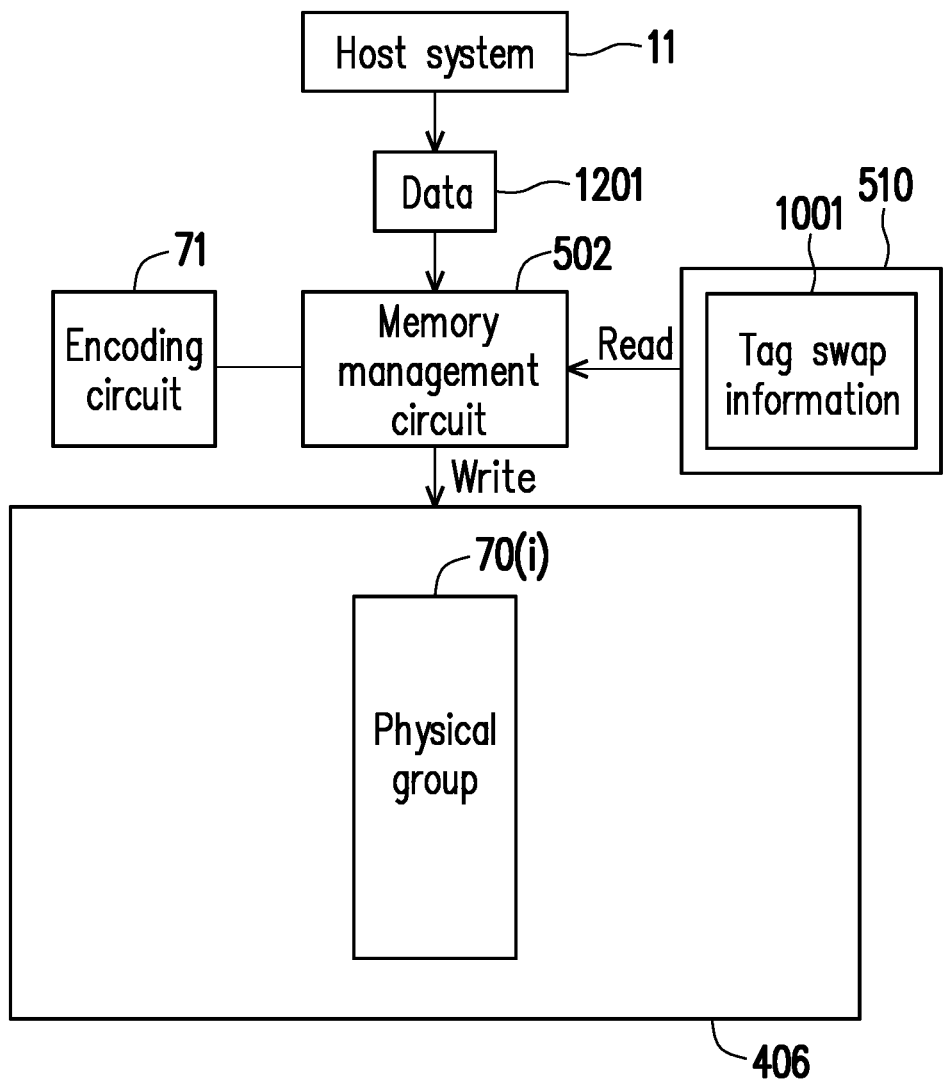
FIG. 12 is a schematic diagram illustrating writing a new data according to an exemplary embodiment of the invention.

FIG. 12 is a schematic diagram illustrating writing a new data according to an exemplary embodiment of the invention. Referring to FIG. 12, continuing with the exemplary embodiments of FIG. 7 to FIG. 11, after the tag swap information 1001 is stored in the buffer memory 510, the memory management circuit 502 may receive a write command instructing to store a data 1201 (also referred to as a first data) from the host system 11. According to the write command, the memory management circuit 502 may instruct the encoding circuit 71 to encode the data 1201. Moreover, the memory management circuit 502 may extract the erased physical group 70(i) from the spare area 602 of FIG. 6 and read the tag swap information 1001 corresponding to the physical group 70(i) from the buffer memory 510. The memory management circuit 502 may instruct the rewritable non-volatile memory module according to the tag swap information 1001 to store the data 1201 encoded by the encoding circuit 71 to the physical group 70(i) in the rewritable non-volatile memory module 406.

Figure 13:
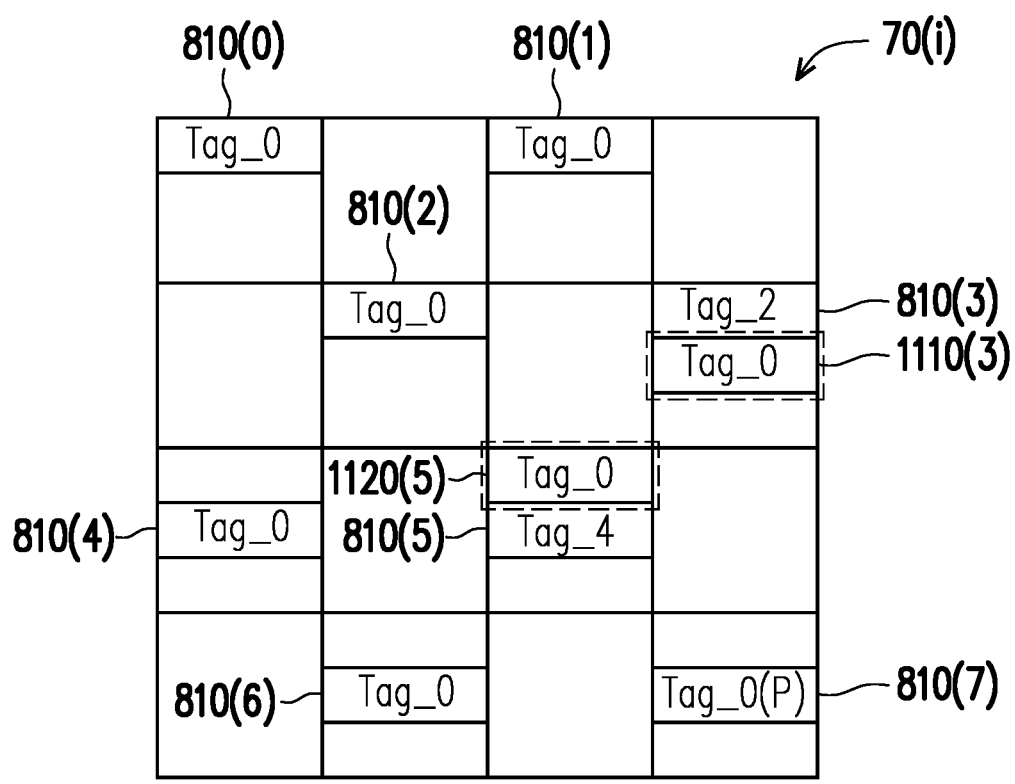
FIG. 13 is a schematic diagram illustrating storing a data according to an adjusted tag configuration according to an exemplary embodiment of the invention.

FIG. 13 is a schematic diagram illustrating storing a data according to an adjusted tag configuration according to an exemplary embodiment of the invention. Referring to FIG. 13, following the exemplary embodiment of FIG. 12, the memory management circuit 502 may store the encoded data 1201 and parity data generated by encoding the data 1201 (i.e., global parity data) in the physical group 70(i). For example, according to the preset tag configuration of the physical group 70(i), the memory management circuit 502 may store a part of the encoded data 1201 (also referred to as the first part of the data) in the physical units 810(0) to 810(2), 810(4), and 810(6) that the tag Tag_0 points to by default and store the global parity data corresponding to the data 1201 in the physical unit 810(7).

Moreover, according to the tag swap information 1001, the memory management circuit 502 may store another part of the encoded data 1201 (also referred to as the second part of the data) in the physical units 1110(3) and 1120(5) pointed to by the swapped tag Tag_0. For example, the physical units 1110(3) and 1120(5) are configured to replace the physical units 810(3) and 810(5) pointed to by the tag Tag_0 by default, so as to reduce the bit error rate of the crossing frames encoding group to which the data 1201 belongs.

In an exemplary embodiment, the bit error rate of the physical unit 1110(3) (needs to be) lower than the bit error rate of the physical unit 810(3), and the bit error rate of the physical unit 1120(5) (needs to be) lower than the bit error rate of the physical unit 810(5). Compared with the preset tag configuration of the physical group 70(i) (that is, the group configuration of crossing frames encoding), tag swap is performed and the encoded data 1201 is stored according to the tag swap information 1001, and the bit error rate of the data stored in all physical units corresponding to the tag Tag_0 may be effectively reduced. Moreover, via the tag swap, the physical units 810(3) and 810(5) originally corresponding to the tag Tag_0 and with a higher bit error rate may be distributed and adjusted to store part of the data corresponding to the tags Tag_2 and Tag_4, thus avoiding excessive concentration of physical units with a higher bit error rate in use.

In an exemplary embodiment, in the process of storing the encoded data 1201 and the corresponding global parity data to the physical units 810(0) to 810(2), 1110(3), 810(4), 1120(5), 810(6), and 810(7), the data fragments of the data 1201 may be stored in the data area of each physical unit. At the same time, the memory management circuit 502 may store the tag swap information 1001 in a spare area in the physical unit that undergoes tag swap. For example, the memory management circuit 502 may store the tag swap information related to the physical unit 1110(3) in the tag swap information 1001 in the spare area of the physical unit 1110(3), store the tag swap information related to the physical unit 1120(5) in the tag swap information 1001 in a spare area in the physical unit 1120(5), store the tag swap information related to the physical unit 810(3) in the tag swap information 1001 in a spare area in the physical unit 810(3), and store the tag swap information related to the physical unit 810(5) in the tag swap information 1001 in a spare area in the physical unit 810(5). Then, the memory management circuit 502 may delete the tag swap information 1001 in the buffer memory 510. Then, when data is read from the physical units 1110(3), 1120(5), 810(3), and/or 810(5), the memory management circuit 502 may learn that the current physical units 1110(3) and/or 1120(5) are both configured to store data belonging to the tag Tag_0 (non-preset data belonging to the tag Tag_2 or Tag_4) according to the tag swap information in the physical units 1110(3), 1120(5), 810(3), and/or 810(5), and the current physical unit 810(3) is configured to store data belonging to the tag Tag_2 (non-preset data belonging to the tag Tag_0) and/or the current physical unit 810(5) is configured to store data belonging to the tag Tag_4 (non-preset data belonging to the tag Tag_0). In an exemplary embodiment, when the data 1201 is to be read from the physical group 70(i), the memory management circuit 502 may instruct the rewritable non-volatile memory module 406 to read data from the physical units 810(0) to 810(2), 1110(3), 810(4), 1120(5), 810(6), and 810(7) and instruct the encoding circuit 71 to decode the read data.

In an exemplary embodiment, when a specific data is to be stored in the physical group 70(i) or a specific data is to be read from the physical group 70(i), the memory management circuit 502 may determine whether there is a tag swap information (for example, the tag swap information 1001) corresponding to the physical group 70(i). For example, the memory management circuit 502 may determine whether there is a tag swap information (such as the tag swap information 1001) corresponding to the physical group 70(i) in the buffer memory 510. Alternatively, the memory management circuit 502 may determine whether the tag swap information exists in one or a plurality of physical units currently to store the data or in one or a plurality of physical units currently to be read. If the memory management circuit 502 may obtain the tag swap information corresponding to the physical group 70(i), then the tag swap information (for example, the tag swap information 1001) corresponding to the physical group 70(i) exists, and therefore the memory management circuit 502 may perform tag swap data access on the physical group 70(i) according to the tag swap information (for example, the tag swap information 1001) corresponding to the physical group 70(i). The relevant operation details are detailed above, and are therefore not repeated herein. Moreover, if the memory management circuit 502 may not obtain the tag swap information corresponding to the physical group 70(i), then the tag swap information (for example, the tag swap information 1001) corresponding to the physical group 70(i) does not exist, and therefore the memory management circuit 502 may access the physical group 70(i) according to the preset tag configuration of the physical group 70(i) (i.e., the preset grouping configuration of crossing frames encoding).

In an exemplary embodiment, the memory management circuit 502 may send a read command sequence to the rewritable non-volatile memory module 406. This read command sequence instructs to read data (such as the second data) from the physical group 70(i). The memory management circuit 502 may adjust the configuration of the crossing frames encoding group of the physical group 70(i) according to the bit error status of the second data. In particular, the configuration of this crossing frames encoding group may reflect that a plurality of physical units in the physical group 70(i) belong to the same crossing frames encoding group (and/or a certain physical unit in the physical group 70(i) belongs to a certain crossing frames encoding group). Thereafter, the memory control circuit unit 502 may access the physical group 70(i) according to the adjusted configuration of the crossing frames encoding group.

In an exemplary embodiment, adjusting the configuration of the crossing frames encoding group of the physical group 70(i) may be achieved by generating or recording the tag swap information corresponding to the physical group 70(i) for future query when the physical group 70(i) is accessed. The relevant details on how to generate and use the tag swap information corresponding to the physical group 70(i) are described in detail above, and are not repeated herein.

In an exemplary embodiment, the adjustment of the configuration of the crossing frames encoding group of the physical group 70(i) may also include directly adjusting the group configuration of the crossing frames encoding of the physical group 70(i) or directly adjusting the algorithm generating the configuration of the crossing frames encoding group of the physical group 70(i), so as to change the preset configuration (or current configuration) of the crossing frames encoding group of the physical group 70(i). In an exemplary embodiment, by directly adjusting the configuration of the crossing frames encoding group of the physical group 70(i) or adjusting the algorithm generating the configuration of the crossing frames encoding group of the physical group 70(i), the memory management circuit 502 may use or not use the tag swap information corresponding to the physical group 70(i) to access the physical group 70(i) according to the configuration of the crossing frames encoding group of the adjusted physical group 70(i).

From another viewpoint, in an exemplary embodiment, for the same physical group 70(i), as the bit error status (for example, bit error rate) of at least part of the physical units in the physical group 70(i) is changed, the tag configuration for data storage in the physical group 70(i) (i.e., the group configuration of crossing frames encoding) may be continuously changed. For example, in the exemplary embodiments of FIG. 7 and FIG. 8, the data stored in the physical group 70(i) is stored in a first tag configuration mode (also referred to as a first group configuration of crossing frames encoding). However, as the bit error rate of at least part of the physical units in the physical group 70(i) is changed, in the exemplary embodiments of FIG. 12 and FIG. 13, the data stored in the physical group 70(i) is changed to a second tag configuration mode (also referred to as a second group configuration of crossing frames encoding) for data storage. By changing the configuration of the crossing frames encoding group of the physical group 70(i), the use efficiency of the physical group 70(i) may be effectively improved, and the service life of the physical group 70(i) may be prolonged, and even the service life of the entire rewritable non-volatile memory module 406 may be extended.

Figure 14:
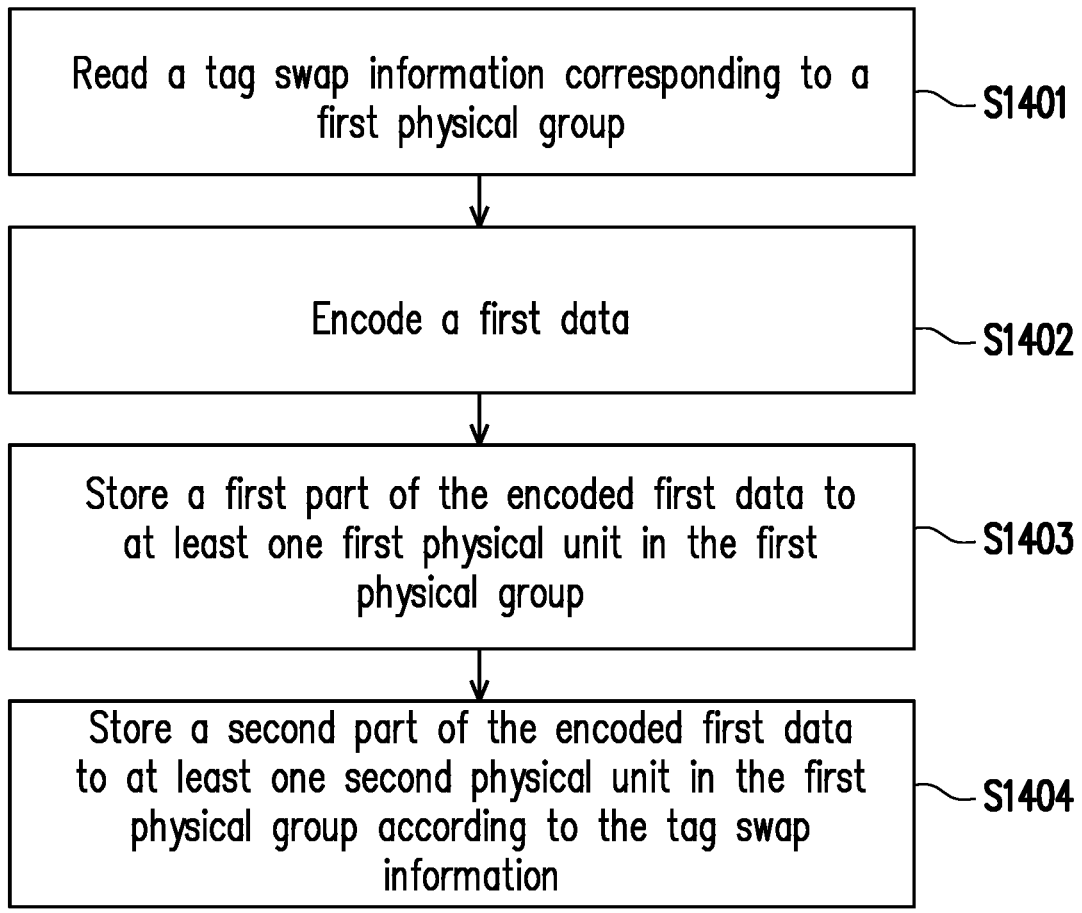
FIG. 14 is a flowchart illustrating a crossing frames encoding management method according to an exemplary embodiment of the invention.

FIG. 14 is a flowchart illustrating a crossing frames encoding management method according to an exemplary embodiment of the invention. Referring to FIG. 14, in step S1401, a tag swap information corresponding to a first physical group is read. In step S1402, a first data is encoded. In step S1403, a first part of the encoded first data is stored in at least one first physical unit corresponding to a certain tag information (also referred to as a first tag information) in the first physical group. In step S1404, a second part of the encoded first data is stored in at least one second physical unit corresponding to another tag information (also referred to as a second tag information) in the first physical group according to the tag swap information. It should be mentioned that, the first tag information corresponds to a certain crossing frames encoding group (also referred to as a first crossing frames encoding group), the second tag information corresponds to another crossing frames coding group (also referred to as a second crossing frames encoding group), and the first crossing frames encoding group is different from the second crossing frames encoding group.

Taking FIG. 13 as an example, the first physical unit may include the physical units 810(0) to 810(2), 810(4), 810(6) (and 810(7)), and the second physical unit may include the physical units 1110(3) and 1120(5). In particular, the initial tag corresponding to the physical units 810(0) to 810(2), 810(4), 810(6) (and 810(7)) is Tag_0, and the initial tags corresponding to the physical units 1110(3) and 1120(5) are Tag_2 and Tag_4, respectively. The crossing frames encoding groups corresponding to the tags Tag_2 and Tag_4 are different from the crossing frames encoding group corresponding to the tag Tag_0. However, after adjusting the configuration of the crossing frames encoding groups (for example, refer to the tag swap information 1001), the physical units 810(0) to 810(2), 810(4), 810(6), 810(7), 1110(3), and 1120(5) may be configured to store data in the same crossing frames encoding group. The relevant operation details are detailed above, and are therefore not repeated herein.

It should be mentioned that, in the above exemplary embodiment, the total number of physical units included in each physical group, the preset tag configuration, and the adjusted tag configuration, etc., are all only examples and may be adjusted according to practical requirements, and are not intended to limit the invention. In addition, the tag swap information (for example, the tag swap information 1001) may record any related information that may be configured to adjust the configuration of the tags, and the invention does not limit the specific content thereof.

Figure 15:
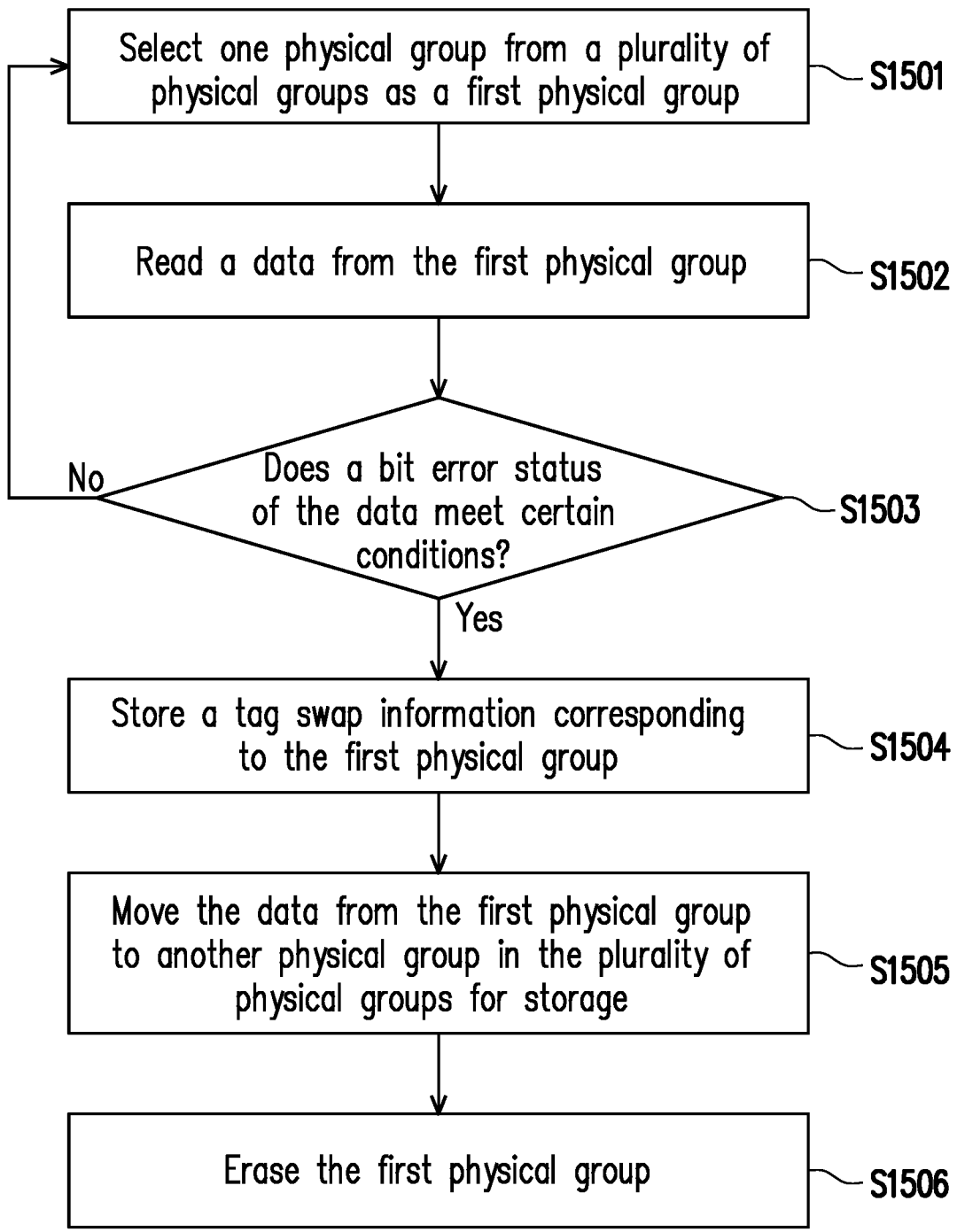
FIG. 15 is a flowchart illustrating a crossing frames encoding management method according to an exemplary embodiment of the invention.

FIG. 15 is a flowchart illustrating a crossing frames encoding management method according to an exemplary embodiment of the invention. Referring to FIG. 15, in step S1501, one physical group is selected from a plurality of physical groups as a first physical group. In step S1502, a data (i.e., a second data) is read from the first physical group. In step S1503, whether an error bit status of the data meets a specific condition is determined. If the error bit status of the data meets the specific condition, then in step S1504, a tag swap information corresponding to the first physical group is stored. If the error bit status of the data does not meet the specific condition, then step S1501 may be repeated to select another physical group as the first physical group.

After step S1504, in step S1505, the data is moved from the first physical group to another physical group (i.e., a second physical group) in the plurality of physical groups for storage. In step S1506, the first physical group may be erased.

Figure 16:
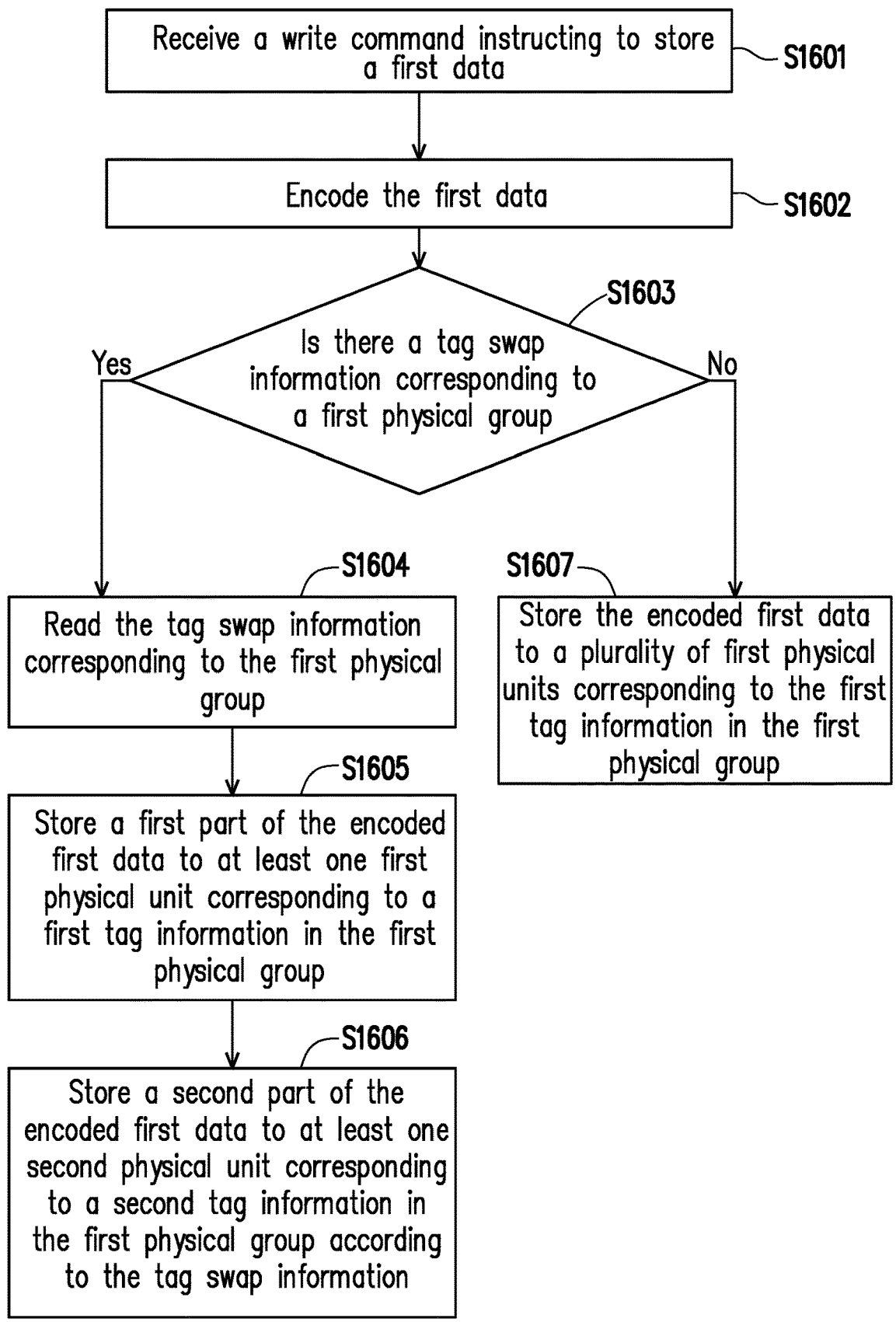
FIG. 16 is a flowchart illustrating a crossing frames encoding management method according to an exemplary embodiment of the invention.

FIG. 16 is a flowchart illustrating a crossing frames encoding management method according to an exemplary embodiment of the invention. Referring to FIG. 16, in step S1601, a write command instructing to store a first data is received. In step S1602, the first data is encoded. In step S1603, whether there is a tag swap information corresponding to a first physical group is determined. If there is the tag swap information corresponding to the first physical group, in step S1604, the tag swap information corresponding to the first physical group is read. In step S1605, a first part of the encoded first data is stored in at least one first physical unit corresponding to a first tag information in the first physical group. In step S1606, a second part of the encoded first data is stored in at least one second physical unit corresponding to a second tag information in the first physical group according to the tag swap information. Moreover, if the determination in step S1603 is no, then in step S1607, (only) the encoded first data is stored in a plurality of first physical units corresponding to the first tag information in the first physical group, without accessing the first physical group according to a tag swap result.

Figure 17:
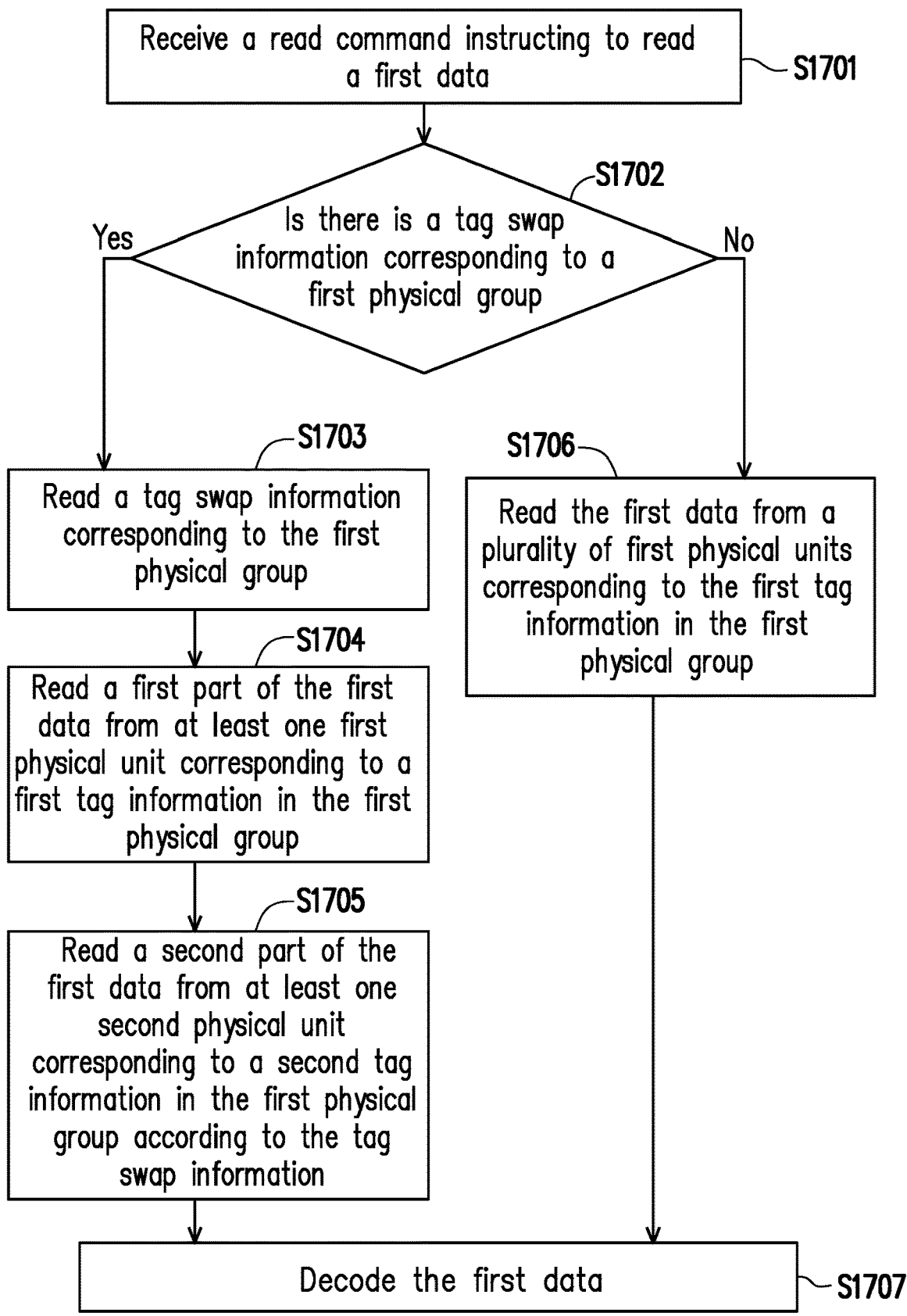
FIG. 17 is a flowchart illustrating a crossing frames encoding management method according to an exemplary embodiment of the invention.

FIG. 17 is a flowchart illustrating a crossing frames encoding management method according to an exemplary embodiment of the invention. Referring to FIG. 17, in step S1701, a read command instructing to read a first data is received. In step S1702, whether there is a tag swap information corresponding to a first physical group is determined. If there is the tag swap information corresponding to the first physical group, then in step S1703, the tag swap information corresponding to the first physical group is read. In step S1704, a first part of the first data is read from at least one first physical unit corresponding to a first tag information in the first physical group. In step S1705, a second part of the first data is read from at least one second physical unit corresponding to a second tag information in the first physical group according to the tag swap information. Moreover, if the determination in step S1702 is no, then in step S1706, (only) the first data is read from a plurality of first physical units corresponding to the first tag information in the first physical group, without accessing the first physical group according to a tag swap result. Thereafter, in step S1707, the first data read is decoded. The decoded first data may be returned in response to the read command.

However, each step in FIG. 14 to FIG. 17 is described in detail above, and is not repeated herein. It should be mentioned that, each step in FIG. 14 to FIG. 17 may be implemented as a plurality of program codes or circuits, and the invention is not limited thereto. Moreover, the methods of FIG. 14 to FIG. 17 may be used with the above exemplary embodiments, and may also be used alone, and the invention is not limited thereto.

Based on the above, in the exemplary embodiments provided by the invention, the tag configuration of the physical groups (i.e., configuration of crossing frames encoding groups) may be dynamically changed according to the usage status of a specific physical group in the rewritable non-volatile memory module (for example, the degree of loss and/or bit error status of each physical unit). By dynamically managing the configuration of the crossing frames encoding groups in the rewritable non-volatile memory module, the use efficiency of the rewritable non-volatile memory module may be effectively improved (for example, the error correction capability of the data stored in the rewritable non-volatile memory module is improved and/or the service life of the rewritable non-volatile memory module is extended).

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A crossing frames encoding management method for a rewritable non-volatile memory module, wherein the rewritable non-volatile memory module comprises a plurality of physical groups, each of the plurality of physical groups comprises a plurality of physical units, and the crossing frames encoding management method comprises:
   reading a tag swap information corresponding to a first physical group in the plurality of physical groups;
   encoding a first data indicated by at least one write command from a host system;
   storing a first part of the encoded first data to at least one first physical unit corresponding to a first tag information in the first physical group; and
   storing a second part of the encoded first data to at least one second physical unit corresponding to a second tag information in the first physical group according to the tag swap information,
   wherein the first tag information corresponds to a first crossing frames encoding group, the second tag information corresponds to a second crossing frames encoding group, and the first crossing frames encoding group is different from the second crossing frames encoding group.

2. The crossing frames encoding management method of claim 1, further comprising:
   configuring a tag information for each physical unit in the first physical group, wherein the tag information reflects a crossing frames encoding group to which each of the physical units belongs.

3. The crossing frames encoding management method of claim 1, further comprising:
   generating a parity data according to an encoding result of the first data,
   wherein the parity data is configured to protect the first part of the first data stored in the at least one first physical unit and the second part of the first data stored in the at least one second physical unit.

4. The crossing frames encoding management method of claim 1, wherein the step of storing the second part of the encoded first data to the at least one second physical unit corresponding to the second tag information in the first physical group according to the tag swap information comprises:
   swapping the second tag information corresponding to the at least one second physical unit with the first tag information corresponding to at least one third physical unit in the first physical group according to the tag swap information; and
   storing the second part to the at least one second physical unit according to a tag swap result.

5. The crossing frames encoding management method of claim 4, wherein a bit error rate of the at least one second physical unit is lower than a bit error rate of the at least one third physical unit.

6. The crossing frames encoding management method of claim 1, wherein the step of storing the second part of the encoded first data to the at least one second physical unit corresponding to the second tag information in the first physical group according to the tag swap information comprises:
   storing the second part of the encoded first data to a data area in the at least one second physical unit; and
   storing the tag swap information to a spare area in the at least one second physical unit.

7. The crossing frames encoding management method of claim 1, further comprising:
   reading a second data from the first physical group before the tag swap information corresponding to the first physical group is read;
   storing the tag swap information according to a bit error status of the second data;
   moving the second data to a second physical group in the plurality of physical groups for storage; and
   erasing the first physical group.

8. The crossing frames encoding management method of claim 7, wherein the step of storing the tag swap information according to the bit error status of the second data comprises:
   storing the tag swap information corresponding to at least one third physical unit in response to a bit error rate of a data read from the at least one third physical unit in the first physical group being higher than a preset value.

9. A memory storage apparatus, comprising:
   a connection interface unit configured to be coupled to a host system;
   a rewritable non-volatile memory module, wherein the rewritable non-volatile memory module comprises a plurality of physical groups, and each of the plurality of physical groups comprises a plurality of physical units; and
   a memory control circuit unit coupled to the connection interface unit and the rewritable non-volatile memory module,
   wherein the memory control circuit unit is configured to read a tag swap information corresponding to a first physical group in the plurality of physical groups,
   the memory control circuit unit is further configured to encode a first data indicated by at least one write command from the host system,
   the memory control circuit unit is further configured to store a first part of the encoded first data to at least one first physical unit corresponding to a first tag information in the first physical group, and
   the memory control circuit unit is further configured to store a second part of the encoded first data to at least one second physical unit corresponding to a second tag information in the first physical group according to the tag swap information,
   wherein the first tag information corresponds to a first crossing frames encoding group, the second tag information corresponds to a second crossing frames encoding group, and the first crossing frames encoding group is different from the second crossing frames encoding group.

10. The memory storage apparatus of claim 9, wherein the memory control circuit unit is further configured to configure a tag information for each physical unit in the first physical group, wherein the tag information reflects a crossing frames encoding group to which each of the physical units belongs.

11. The memory storage apparatus of claim 9, wherein the memory control circuit unit is further configured to generate a parity data according to an encoding result of the first data, and
   the parity data is configured to protect the first part of the first data stored in the at least one first physical unit and the second part of the first data stored in the at least one second physical unit.

12. The memory storage apparatus of claim 9, wherein the operation of storing the second part of the encoded first data to the at least one second physical unit corresponding to the second tag information in the first physical group according to the tag swap information comprises:
  swapping the second tag information corresponding to the at least one second physical unit with the first tag information corresponding to at least one third physical unit in the first physical group according to the tag swap information; and
  storing the second part to the at least one second physical unit according to a tag swap result.

13. The memory storage apparatus of claim 12, wherein a bit error rate of the at least one second physical unit is lower than a bit error rate of the at least one third physical unit.

14. The memory storage apparatus of claim 9, wherein the operation of storing the second part of the encoded first data to the at least one second physical unit corresponding to the second tag information in the first physical group according to the tag swap information comprises:
  storing the second part of the encoded first data to a data area in the at least one second physical unit; and
  storing the tag swap information to a spare area in the at least one second physical unit.

15. The memory storage apparatus of claim 9, wherein the memory control circuit unit is further configured for:
  reading a second data from the first physical group before the tag swap information corresponding to the first physical group is read;
  storing the tag swap information according to a bit error status of the second data;
  moving the second data to a second physical group in the plurality of physical groups for storage; and
  erasing the first physical group.

16. The memory storage apparatus of claim 15, wherein the operation of storing the tag swap information according to the bit error status of the second data comprises:
  storing the tag swap information corresponding to at least one third physical unit in response to a bit error rate of a data read from the at least one third physical unit in the first physical group being higher than a preset value.

17. A memory control circuit unit, configured to control a rewritable non-volatile memory module, wherein the rewritable non-volatile memory module comprises a plurality of physical groups, each of the plurality of physical groups comprises a plurality of physical units, and the memory control circuit unit comprises:
  a host interface configured to be coupled to a host system;
  a memory interface configured to be coupled to the rewritable non-volatile memory module;
  an error detection and correction circuit; and
  a memory management circuit coupled to the host interface, the memory interface, and the error detection and correction circuit,
  wherein the memory management circuit is configured to read a tag swap information corresponding to a first physical group in the plurality of physical groups,
  the error detection and correction circuit is configured to encode a first data indicated by at least one write command from the host system,
  the memory management circuit is further configured to store a first part of the encoded first data to at least one first physical unit corresponding to a first tag information in the first physical group, and
  the memory management circuit is further configured to store a second part of the encoded first data to at least one second physical unit corresponding to a second tag information in the first physical group according to the tag swap information,
  wherein the first tag information corresponds to a first crossing frames encoding group, the second tag information corresponds to a second crossing frames encoding group, and the first crossing frames encoding group is different from the second crossing frames encoding group.

18. The memory control circuit unit of claim 17, wherein the memory management circuit is further configured to configure a tag information for each physical unit in the first physical group, wherein the tag information reflects a crossing frames encoding group to which each of the physical units belongs.

19. The memory control circuit unit of claim 17, wherein the error detection and correction circuit is further configured to generate a parity data according to an encoding result of the first data, and
  the parity data is configured to protect the first part of the first data stored in the at least one first physical unit and the second part of the first data stored in the at least one second physical unit.

20. The memory control circuit unit of claim 17, wherein the operation of storing the second part of the encoded first data to the at least one second physical unit corresponding to the second tag information in the first physical group according to the tag swap information comprises:
  swapping the second tag information corresponding to the at least one second physical unit with the first tag information corresponding to at least one third physical unit in the first physical group according to the tag swap information; and
  storing the second part to the at least one second physical unit according to a tag swap result.

21. The memory control circuit unit of claim 20, wherein a bit error rate of the at least one second physical unit is lower than a bit error rate of the at least one third physical unit.

22. The memory control circuit unit of claim 17, wherein the operation of storing the second part of the encoded first data to the at least one second physical unit corresponding to the second tag information in the first physical group according to the tag swap information comprises:
  storing the second part of the encoded first data to a data area in the at least one second physical unit; and
  storing the tag swap information to a spare area in the at least one second physical unit.

23. The memory control circuit unit of claim 17, wherein the memory management circuit is further configured for:
  reading a second data from the first physical group before the tag swap information corresponding to the first physical group is read;
  storing the tag swap information according to a bit error status of the second data;
  moving the second data to a second physical group in the plurality of physical groups for storage; and
  erasing the first physical group.

24. The memory control circuit unit of claim 23, wherein the operation of storing the tag swap information according to the bit error status of the second data comprises:
  storing the tag swap information corresponding to at least one third physical unit in response to a bit error rate of a data read from the at least one third physical unit in the first physical group being higher than a preset value.

25. A memory storage apparatus, comprising:
- a connection interface unit configured to be coupled to a host system;
- a rewritable non-volatile memory module, wherein the rewritable non-volatile memory module comprises a plurality of physical groups, and each of the plurality of physical groups comprises a plurality of physical units; and
- a memory control circuit unit coupled to the connection interface unit and the rewritable non-volatile memory module,
- wherein the memory control circuit unit is configured to send a read command sequence instructing to read a second data from a first physical group in the plurality of physical groups,
- the memory control circuit unit is further configured to adjust a configuration of a crossing frames encoding group of the first physical group according to a bit error status of the second data, and the configuration of the crossing frames encoding group reflects that a plurality of physical units in the first physical group belong to a same crossing frames encoding group, and
- the memory control circuit unit is further configured to access the first physical group according to the adjusted configuration of the crossing frames encoding group.

26. The memory storage apparatus of claim 25, wherein the operation of adjusting the configuration of the crossing frames encoding group of the first physical group according to the bit error status of the second data comprises:
- adjusting the configuration of the crossing frames encoding group of the first physical group in response to a bit error rate of a data read from at least one third physical unit in the first physical group being higher than a preset value.

27. The memory storage apparatus of claim 25, wherein the operation of adjusting the configuration of the crossing frames encoding group of the first physical group according to the bit error status of the second data comprises:
- swapping the crossing frames encoding group to which a part of the physical units in the first physical group belongs and the crossing frames encoding group to which another part of the physical units in the first physical group belongs to change the configuration of the crossing frames encoding group of the first physical group.

28. The memory storage apparatus of claim 27, wherein the operation of swapping the crossing frames encoding group to which the part of the physical units in the first physical group belongs with the crossing frames encoding group to which the other part of the physical units in the first physical group belongs comprises:
- swapping a tag information corresponding to the part of the physical units in the first physical group with a tag information corresponding to the other part of the physical units in the first physical group.

29. The memory storage apparatus of claim 25, wherein the operation of accessing the first physical group according to the adjusted configuration of the crossing frames encoding group comprises:
- storing a tag swap information reflecting the adjusted configuration of the crossing frames encoding group of the first physical group; and
- accessing the first physical group according to the tag swap information.

* * * * *